US012737734B1

(12) United States Patent
Fastner et al.

(10) Patent No.: US 12,737,734 B1
(45) Date of Patent: Sep. 15, 2026

(54) SYSTEMS, METHODS, AND MEDIA FOR OPTIMIZING MAINTENANCE OF FACILITY UNITS

(71) Applicant: Direct Supply, Inc., Milwaukee, WI (US)

(72) Inventors: Charles W. Fastner, Pewaukee, WI (US); Timothy L. Ernst, Grafton, WI (US)

(73) Assignee: Direct Supply, Inc., Milwaukee, WI (US)

( * ) Notice: Subject to any disclaimer, the term of this patent is extended or adjusted under 35 U.S.C. 154(b) by 0 days.

(21) Appl. No.: 18/974,600

(22) Filed: Dec. 9, 2024

Related U.S. Application Data

(60) Provisional application No. 63/607,917, filed on Dec. 8, 2023.

(51) Int. Cl.
*G06Q 10/20* (2023.01)
*G06Q 30/0645* (2023.01)

(52) U.S. Cl.
CPC ......... *G06Q 10/20* (2013.01); *G06Q 30/0645* (2013.01)

(58) Field of Classification Search
CPC ............... G06Q 30/0645; G06Q 10/20; G06Q 10/063114; G06Q 50/163
See application file for complete search history.

(56) References Cited

U.S. PATENT DOCUMENTS 7,664,667 B1 2/2010 Ruppelt et al.
8,103,531 B2 1/2012 Wollan et al.
8,180,661 B2 5/2012 Thielges et al.
8,271,321 B1 9/2012 Kestenbaum
8,600,556 B2 12/2013 Nesler et al.
8,719,066 B2 5/2014 Cartwright
8,965,927 B2 2/2015 Ferrara et al.
9,479,388 B2 10/2016 Castel et al.
9,536,231 B2 1/2017 Lerick et al.
(Continued)

FOREIGN PATENT DOCUMENTS

CA 2932198 A1 12/2016

OTHER PUBLICATIONS

Bouabdallaoui et al. Predictive Maintenance in Building Facilities: A Machine Learning-Based Approach. Sensors (Basel). Feb. 3, 2021;21(4):1044. doi: 10.3390/s21041044. PMID: 33546418; PMCID: PMC7913483. (Year: 2021).*
(Continued)

*Primary Examiner* — George Chen
*Assistant Examiner* — Tayar M Kyu
(74) *Attorney, Agent, or Firm* — Ashurst Perkins Coie US LLP

(57) ABSTRACT

Systems, methods, and media for optimizing maintenance of facility units include proactively addressing the condition of a vacated unit before turning the unit over to a new occupant. The systems, methods, and media can incorporate a variety of information including the current condition of the unit, human input regarding the current condition of the unit, historical data regarding unit turns, stakeholder configurations and preferences, economic data associated with facility locations, and models to optimize maintenance events for facility units to help organizations achieve objectives more efficiently.

20 Claims, 4 Drawing Sheets

(56) References Cited

U.S. PATENT DOCUMENTS

| | | | |
|---|---|---|---|
| 9,818,072 | B2 | 11/2017 | Perez, Jr. et al. |
| 10,025,887 | B1 | 7/2018 | Santarone et al. |
| 10,216,155 | B2 | 2/2019 | Zhu et al. |
| 10,235,639 | B1 | 3/2019 | Mandel et al. |
| 10,241,505 | B2 | 3/2019 | Cohen et al. |
| 10,268,782 | B1 | 4/2019 | Santarone et al. |
| 10,498,808 | B2 | 12/2019 | Purushothaman et al. |
| 10,685,308 | B1 | 6/2020 | Avery, Jr. et al. |
| 10,901,446 | B2 | 1/2021 | Nesler et al. |
| 10,949,807 | B2 | 3/2021 | Jayaraman et al. |
| 10,977,881 | B1 | 4/2021 | Buentello et al. |
| 11,055,797 | B1 | 7/2021 | Carone |
| 11,062,274 | B2 | 7/2021 | Morisawa et al. |
| 11,354,443 | B2 | 6/2022 | Balzamo, Jr. |
| 11,948,214 | B1 * | 4/2024 | Hammill ............ G06Q 30/0206 |
| 2002/0095269 | A1 | 7/2002 | Natalini et al. |
| 2002/0138289 | A1 | 9/2002 | Thielges et al. |
| 2009/0063202 | A1 | 3/2009 | Becerra et al. |
| 2009/0216552 | A1 | 8/2009 | Watrous |
| 2010/0023352 | A1 | 1/2010 | Smith et al. |
| 2012/0047082 | A1 | 2/2012 | Bodrozic |
| 2013/0054276 | A1 | 2/2013 | Hamann |
| 2013/0290052 | A1 * | 10/2013 | Settino ............ G06Q 10/06311 705/7.15 |
| 2014/0359677 | A1 | 12/2014 | Ogle |
| 2015/0193864 | A1 * | 7/2015 | Allison .............. G06Q 30/0645 705/5 |
| 2015/0302414 | A1 | 10/2015 | Cox et al. |
| 2018/0102958 | A1 | 4/2018 | Guthrie et al. |
| 2018/0204167 | A1 | 7/2018 | Rayner et al. |
| 2018/0240055 | A1 | 8/2018 | Theus et al. |
| 2019/0102753 | A1 | 4/2019 | Harrison et al. |
| 2019/0156443 | A1 | 5/2019 | Hall |
| 2019/0325368 | A1 | 10/2019 | Turney et al. |
| 2019/0355076 | A1 | 11/2019 | Marcinkowski et al. |
| 2021/0056509 | A1 * | 2/2021 | Lindy .................... G06Q 50/18 |
| 2021/0089940 | A1 | 3/2021 | Lin et al. |
| 2021/0090188 | A1 * | 3/2021 | Lai ......................... G06Q 10/20 |
| 2021/0398054 | A1 | 12/2021 | Jaggers et al. |
| 2022/0374030 | A1 | 11/2022 | Lehtonen et al. |
| 2022/0413669 | A1 | 12/2022 | Fastner et al. |

OTHER PUBLICATIONS

FMX Learning Center, FMX Administrator Maintenance, Technology, and Custom Work Request Module Guide, Retrieved from https://web.archive.org/web/20170308061228/https://help.gofmx.com/hc/en-us/articles/207050896-FMX-Administrator-Maintenance-Technology-and-Custom-Work-Request-Module-Guide, 2017, 7 pages.

* cited by examiner

SYSTEMS, METHODS, AND MEDIA FOR OPTIMIZING MAINTENANCE OF FACILITY UNITS

CROSS-REFERENCE TO RELATED APPLICATION

This application claims the benefit of and priority to U.S. Provisional Patent Application No. 63/607,917, filed on Dec. 8, 2023, the entire disclosure of which is incorporated herein by reference.

BACKGROUND

Operators of facilities such as senior living facilities often operate multiple facilities over a large geographic area. The performance of maintenance and repair of assets at each facility can be delegated to a maintenance director or other local employee that can be on site at the facility. Facility maintenance can be a costly endeavor, especially when an operator operating many facilities does not have appropriate mechanisms for controlling costs. When a unit becomes vacant, the maintenance director or other local employee may evaluate the unit to determine if anything is broken or need repair before turning the unit over to a new resident. However, this type of reactive maintenance can cause missed opportunities to upgrade the unit before turning it over.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
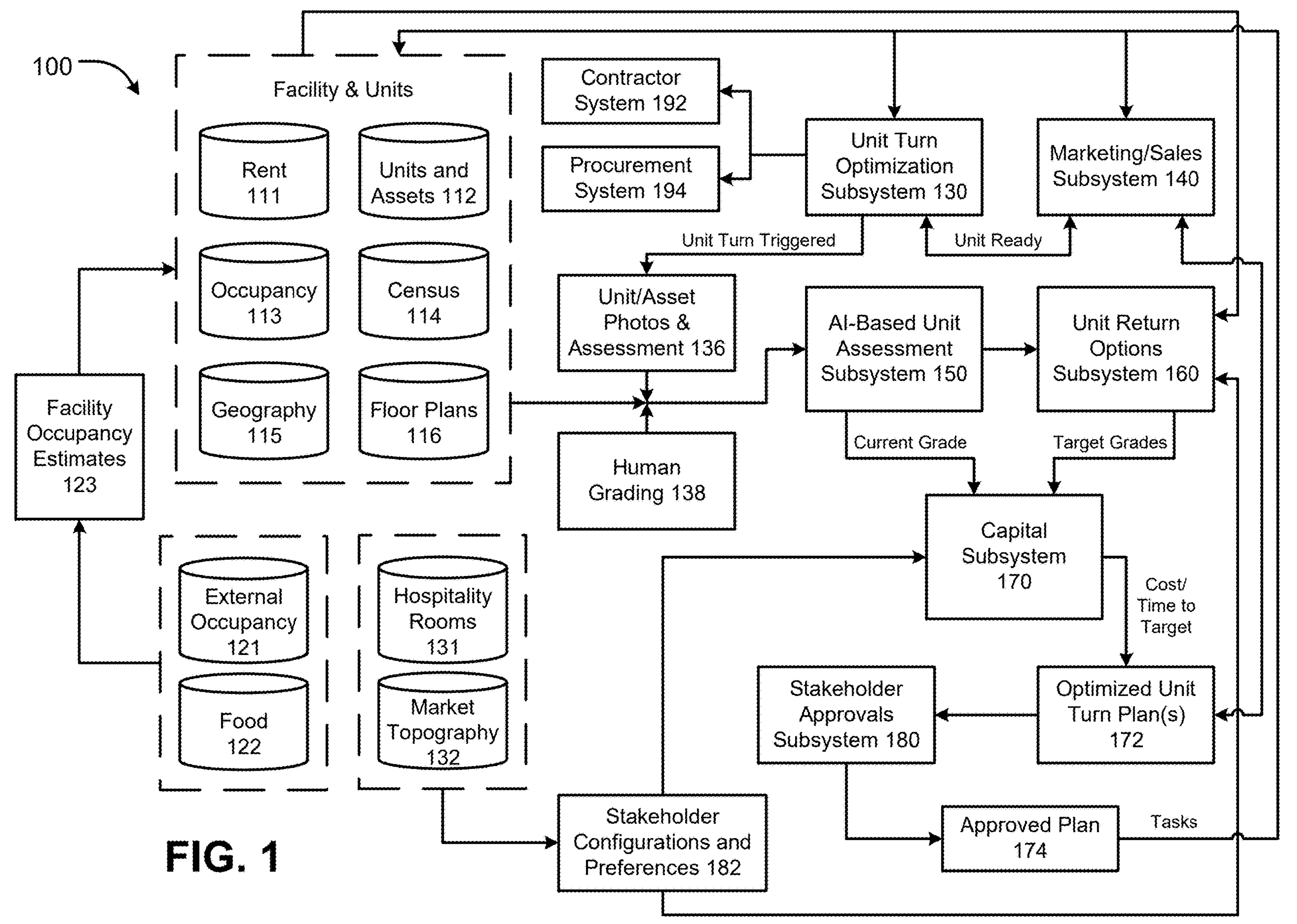
FIG. 1 is a block diagram illustrating an example system for optimizing maintenance of facility units, in accordance with some aspects of the disclosure.

Systems, methods, and media for automatically optimizing maintenance of facility units can include collecting various types of data associated with different units at different facilities. For example, for a given unit in a given facility, data including images associated with the unit, information about the location of the unit within the facility, information about the facility that the unit is located in, and information about market conditions associated with the unit can be collected. Then, using specific processing techniques, this data can be used by a computing system to automatically generate various types of grades associated with the given unit. For example, an overall grade for the unit can be generated by blending a building (facility) grade, a market grade, a unit grade, and a rent grade. The overall grade for the unit can then be compared to human feedback, for example using a learned algorithm. As a result, various biases including biases that may be associated with organizations and/or individuals can be reduced or eliminated from the unit evaluation process.

The systems, methods, and media as described herein can be used by organizations and individuals to provide recommendations regarding how to position units for optimized return. The optimization can be conducted based on various different types and/or combinations of objectives, including rent maximization, investment minimization, return on assets (ROA) over a lifespan, and/or other objectives. The systems, methods, and media as described herein can be used to answer the question: if X amount of dollars are desired for collection in rent for a given unit, what actions need to be taken on that unit to position it for collecting that amount of rent? The unit positioning can be compared to current (real-time) market inventory, trends, and/or organizational objectives to arrive at a recommended positioning for optimized return. An underlying assumption that can be considered as part of the techniques described herein can revolve around the idea that facilities cannot kick residents out of units, and therefore unit turns (e.g., events that occur when unit occupancy changes overs to different individuals) serve as the continuous improvement lifecycle for a facility to reposition itself to the market. Moreover, the capital requirements for positioning the unit in accordance with the desired objectives can be generated and provided to an individual or organization along with a rent target for a new unit.

The systems, methods, and media as described herein can be used to address specific technical problems that arise in the field of facility management. For example, using existing computer systems for facility management, facilities may be reactive instead of proactive when it comes to performing maintenance on units in a given facility. Work orders and other maintenance tasks can be scheduled in response to various issues that arise (e.g., a resident submits a complaint, maintenance personnel discover a problem with equipment, etc.), however this approach does not consider broader objectives for the organization and/or the facility. If facilities rely only on this type of reactive maintenance, the units they offer for sale or rent on the open market can struggle to attract the desired renters or buyers, and thus the facilities and organizations can struggle to meet various objectives. The specific technical approaches described herein not only incorporate a variety of different types of data into the unit evaluation and maintenance process, but they also incorporate human feedback and use trained models to eliminate biases and help facilities and organizations efficiently achieve particular objectives in terms of facility management.

Referring to FIG. 1, a block diagram illustrating an example system 100 for optimizing maintenance of facility units is shown, in accordance with some aspects of the disclosure. The system 100 is generally a computer system and is shown to include a variety of different components, including data sources, data processing components, and various inputs and outputs. It will be appreciated that the system 100 can be implemented in a wide variety of manners, including various software architectures, hardware architectures, and network architectures. The system 100 can be used to provide proactive and dynamic facility management functionality that helps facilities and/or organizations achieve various objectives. The system 100 is shown to include various subsystem components such as a unit turn optimization (UTO) subsystem 130, a marketing and sales subsystem 140, an artificial intelligence (AI) based unit assessment subsystem 150, a unit return options subsystem 160, a capital subsystem 170, as well as a stakeholder approvals subsystem 180. As shown, the system 100 can ultimately generate an approved plan 174.

The system 100 is shown to include a variety of data sources associated with a facilities and units. These data sources include rent data 111, units and assets data 112, occupancy data 113, census data 114, geography data 115, and floor plan data 116. The rent data 111 can include any data indicative of rent levels associated with different units in a given facility, as well as aggregate rent data for the facility. The units and assets data 112 can include any data indicative of any kinds of details associated with units in a given facility, as well as information about assets contained within units in the facility. The occupancy data 113 can include any data indicative of occupancy information associated with a unit in a given facility, such as length of time units have been occupied and/or unoccupied, and time period associated with unit turns. The census data 114 can include any data indicative of characteristics of residents of a given facility, such as age, gender, quantity, disability information, medical information, dietary information, and any other information. The geography data 115 can include any data indicative of geographical information associated with a given facility, such as publicly available map data. The floor plan data 116 can include any suitable data indicative of floor plans for a given facility, including number of units on each floor, locations of units on each floor, and any other information.

The external occupancy data 121 can include any suitable data indicative of occupancy of various competing facilities, such as other assisted living facilities in the same geographical area. The external occupancy data 121 can be acquired from the National Investment Center (NIC), for example, among other possible sources. The food data 122 can include any suitable data indicative of food items ordered by a facility. The hospitality rooms data 131 can include any suitable data indicative of information related to hospitality rooms (e.g., publicly available data regarding hospitality rooms at hotels), such as data indicative of prices, quality and grades, and occupancy rate information associated with hospitality rooms. The market topography data 132 can include any suitable data indicative of one or more economic conditions associated with a location of a given facility, such as cost of living, housing prices, new construction data, competitor occupancy rates, demographic trends, and any other suitable information.

The unit turn optimization subsystem 130 can determine when a unit turn is triggered for a facility. For example, in a senior living facility, an electronic medical records (EMR) system can provide an indication that a unit in the facility has been vacated. The unit can be vacated for a variety of reasons. After a unit turn is triggered, a maintenance director (MD) associated with the facility can perform a unit an assessment of the unit and record unit assessment data 136. The unit assessment data 136 can include various information about the vacated unit recorded by the maintenance director (and/or other personnel), such as a collection of photos, videos, notes, and any other information associated with different assets and components within the vacated unit. The assets and components within the vacated unit can include furniture, appliances (e.g., stove dishwasher, microwave, etc.), heating ventilation, and air conditioning (HVAC) equipment, windows, doors, running water (e.g., sinks, showers, tubs, toilets, etc.), medical equipment (e.g., nurse call devices and systems, heart rate monitors, blood pressure monitors, etc.), and any other kinds of assets and components that may be present in the vacated unit.

The unit turn optimization subsystem 130 can be in communication with the marketing and sales subsystem 140 to receive information regarding current and/or previous rent levels associated with the vacated unit, as well as any other information related to the marketing and/or sales of units maintained by the marketing and sales subsystem 140. The unit turn optimization subsystem 130 can also receive and provide the real-time occupancy data 113 for the facility. The occupancy data 113 can include individual unit level occupancy data (e.g., specific units that are currently occupied and associated grades) as well as higher level data across a given facility and/or across a collection of facilities associated with an organization. The unit turn optimization subsystem 130 can also generate the real-time facility occupancy estimates 123 in a variety of scenarios based on the external occupancy data 121 and/or the food data 122. For example, the unit turn optimization subsystem 130 can use the food data 122 to determine how much food is being ordered by a given facility over time to generate the facility occupancy estimates 123. The facility occupancy estimates 123 can be helpful in determining the rate of occupancy change for the facility. The unit turn optimization subsystem 130 can provide the facility occupancy estimates 123 to the unit return options subsystem 160 as described further below.

The AI-based unit assessment subsystem 150 can include a variety of different types and/or combinations of machine learning and artificial intelligence models used to dynamically generate grades for vacated units based on a variety of factors. The AI-based unit assessment subsystem 150 can include any suitable types of models and algorithms, including one or more supervised models, unsupervised models, semi-supervised models, deep learning models, and/or any other suitable types of models and algorithms. For example, the AI-based unit assessment subsystem 150 can be implemented using support-vector machines, decisions trees, linear and/or logistic regression models, neural networks, clustering algorithms, anomaly detection algorithms, and the like. The AI-based unit assessment subsystem 150 can receive as input the unit assessment data 136 as well as human grading data 138. The AI-based unit assessment subsystem 150 in some examples can include separate models trained and used for scoring individual assets (e.g., furniture, appliances, other factors) within units and for scoring units as a whole. It will be appreciated that various implementations of the AI-based unit assessment subsystem 150 are contemplated and possible within the scope of the present disclosure.

The human grading data 138 can include a variety of different information submitted to the system 100 (e.g., via a user interface presented on a computing device) related to grading of units and assets within units. The human grading data 138 can be used by the AI-based unit assessment subsystem 150 not only as an input when generating new grades, but also to train one or models maintained by the AI-based unit assessment subsystem 150. For example, the human grading data 138 can indicate that a Unit A should be awarded a higher grade than Unit B, that Asset C should be awarded a grade of X, etc. Unit A can be awarded a higher grade by a human due to the presence of a view of nature (e.g., a lake, trees, etc.) in Unit A compared to the presence of a view of a parking lot in Unit B, for example. The human grading data 138 can be used not only to help generate overall grades for units, but also to help generate grades/scores for different assets within units.

Ultimately, the AI-based unit assessment subsystem 150 can generate a current grade for a vacated unit based on a variety of factors. These factors can include the location of the unit within the facility, the size of the unit, the view from the unit (e.g., through windows and/or from one or more balconies, patios, etc.), amenities within the unit and/or facility, and information about the condition (e.g., type, condition, age, images) of assets (e.g., floors, carpet, countertops, walls, fixtures, appliances, cabinets, etc.) within the unit. For example, the location of the vacated unit within the facility, the size of the vacated unit, and the view from the unit (e.g., as indicated by the user assessment data 136, the geography data 115, the floor plan data 116, rent data 111, occupancy data 113, etc.) can be provided as input to the AI-based unit assessment subsystem 150 to generate the current grade for the vacated unit.

The unit return options subsystem 160 can be configured to determine a target grade or target grades for the vacated unit based on a variety of information. For example, the unit return options subsystem 160 can receive stakeholder configurations and preferences data 182 as shown in FIG. 1 to generate a target grade for the vacated unit. The stakeholder configurations and preferences data 182 can include risk tolerance information, investment tolerance information (e.g., capital expense budget or other type of budget for a particular facility and/or organization), wait-time thresholds for occupancy of units, target rent levels, and/or return horizons (e.g., 1-year horizon, 2-year horizon, etc.) associated with one or more stakeholders associated with the facility (e.g., owners, investors, etc.). The stakeholder configurations and preferences data 182 can further include various types and combinations of desired grades/scores, such as a set desired number of units associated with one or more grades (e.g., 20% of units graded "A", 50% of units graded "B", etc.), a desired overall grade/rating for the facility, and the like. The automatic integration of configurations and preferences associated with facility stakeholders in this manner can provide significant advantages in terms of facility management capabilities provided by the system 100 overall.

The unit return options subsystem 160 can also determine the target grade or target grades for the vacated unit based on the rent data 111, the units and assets data 112, the occupancy data 113, the census data 114, the geography data 115, and/or the floor plan data 116, for example. Each of the target grades generated by the unit return options subsystem 160 can be paired with a likelihood of occupancy within a threshold amount of time. For example, the unit return options subsystem 160 can generate the likelihood that performing maintenance on the vacated unit such that the vacated unit can be awarded a grade of "B" will result in occupancy of the unit within 30 days, within 60 days, within 90 days, etc. Also, the unit return options subsystem 160 can identify a number of days estimated to result in a given likelihood of occupancy (e.g., it will take n days to achieve a 95% likelihood of occupancy if maintenance is performed on the vacated unit such that the vacated unit can be awarded a grade of "A").

The unit return options subsystem 160 can also determine unit return options based on general factors and market-specific factors, such as by using the hospitality rooms data 131 and/or the market topography data 132. The hospitality rooms data 131 can be used by the unit return options subsystem 160 as a proxy for skilled nursing facility (SNF) and assisted living (AL) data for a given market. The market topography data 132 can include economic data (e.g., cost of living in a geographic area, housing prices in a geographic area, etc.), new construction data, occupancy rates for competing facilities, demographic trends, and/or any other suitable market topography data. Additionally, the unit return options subsystem 160 can determine unit return options based on the rent data 111, the units and assets data 112, the occupancy data 113, the census data 114, the geography data 115, the floor plan data 116, the unit assessment data 136, the human grading data 138, and/or any other data maintained and/or used within the system 100.

The unit return options subsystem 160 can generate target grades in a variety of suitable manners. For example, the unit return options subsystem 160 can consider the overall quality, rating, and/or grade of the facility. For example, a given facility can have a rating from 1-5 and within the facility units can be graded either A, B, or C. Also, the unit return options subsystem 160 can generate both relative and absolute ratings for units and/or facilities. For example, the unit rating can be relative to the facility, and the facility and unit ratings can be relative to the market. The unit return options subsystem 160 can, in some examples, aggregate the relative ratings into an absolute rating for units and/or facilities regardless of the market and/or facility. The unit return options subsystem 160 can also generate absolute ratings and then convert the absolute ratings into relative ratings specific to the facility and/or market.

The unit return options subsystem 160 can estimate the number of units associated with particular grades in a facility that will likely turn over in a given time period (e.g., a given fiscal year). For example, the unit return options subsystem 160 can perform this estimation using a survival analysis technique and/or another suitable statistical technique. As units in a given facility are turned over to new occupants, the unit return options subsystem 160 can track the number of units associated with particular grades along with the associated spending. The unit return options subsystem 160 can then use this data to update (e.g., adjust, optimize, etc.) the spending and target grades it generates to remain on track with a given budget or another objective. Based on any/all of the factors discussed above, the unit return options subsystem 160 can determine the best target grade option for a given unit, and/or the unit return options subsystem 160 can identify multiple options with generally similar outcomes. The unit return options subsystem 160 can then cause presentation of one or more options via a user interface, where one outcome can be labeled as a recommended outcome and/or rankings for various identified options can be presented.

The capital subsystem 170 can be configured to perform optimization analysis based on a current grade for a vacated unit (e.g., as determined by the AI-based unit assessment subsystem 150), one or more target grades for the vacated unit (e.g., as determined by the unit return options subsystem 160), and/or other information. The capital subsystem 170 can accordingly determine the cost and time requirements to get to different target unit grades and associated target rent (or purchase) levels for the vacated unit based on the optimization analysis. The capital subsystem 170 can also determine one or more optimized unit turn plans 172 as shown in FIG. 1 based on the optimization analysis. The optimized unit turn plans 172 can indicate one or more actions that need to be taken (and one or more actions that do not need to be taken in some examples) to get to particular target grades and/or to maintain the current grade for the vacated unit. The actions indicated by the optimized unit turn plans 172 can minimize cost while maximizing return (e.g., rent accounting for occupancy and time to occupancy).

For example, the capital subsystem 170 can determine that, for a particular unit, the carpeting needs to be replaced in order to maintain the current grade. Also, the capital subsystem 170 can determine that leaving the carpeting as-is (e.g., not replacing the carpet, but instead only cleaning the carpet) would lower the current grade for the unit, and the capital subsystem 170 can determine that replacing both the countertops and the carpet would raise the current grade for the unit. The capital subsystem 170 can also determine that, while leaving the carpeting as-is would lower the current grade for the unit, leaving the carpet as-is may also be the best path forward based on the stakeholder configurations and preferences data 182, the market topography data 132, and/or other factors. For example, the capital subsystem 170 can determine that the lower grade can lead to a lower rent level and a faster time to occupancy, which can align better with the desired objectives for the facility.

The capital subsystem 170 can provide the optimized unit turn plans 172 to the marketing and sales subsystem 140 such that the optimized unit turn plans 172 can be presented along with associated predicted costs and/or times to occupancy to sales and/or marketing personnel. In some examples, the system 100 can require a marketing administrator to sign off on one or more of the optimized unit turn plans 172. The marketing administrator can also select one or more of the optimized unit turn plans 172 via a user interface presented on a computing device, for example. The marketing administrator can override recommended tasks associated with the optimized unit turn plans 172 via the user interface as well as select between different options for tasks that can be completed for the unit. The inputs provided by the marketing administrator and/or other marketing and sales personnel regarding the optimized unit turn plans 172 generated by the capital subsystem 170 can be assembled into one or more training datasets and used to train one or more models maintained and used by the AI-based unit assessment subsystem 150.

Moreover, the capital subsystem 170 can recommend a specific ones of the optimized unit turn plans 172 based on various factors including the stakeholder configurations and preferences data 182 (e.g., the facility owner wants to increase the number of higher grade units in the facility and make the facility higher end overall). For example, the capital subsystem 170 can recommend specific optimized unit turn plans 172 that result in an increased grade for premium units in the facility (e.g., larger units with desirable views) to provide the facility with higher rent options. Alternatively, the capital subsystem 170 can recommend specific optimized unit turn plans 172 that result in minimal investment in terms of cost to perform maintenance tasks when the stakeholder configurations and preferences data 182 indicates that no significant increases in rent collection are desired, for example.

The capital subsystem 170 can further be configured to automatically select one or more of the optimized unit turn plans 172 without requiring any input from any users to increase the automation of the facility management processes and thereby improve operational efficiency. The capital subsystem 170 may only require user input in certain scenarios, such as where multiple options essentially require the same cost and time (e.g., a tie or near tie) and user expertise may be desirable to decide between the options. In such scenarios, the capital subsystem 170 can prompt a user (e.g., via an email or other type of electronic alert) with the information needed to decide between the options. Then, the capital subsystem 170 can choose between the options based on an input received from the user (e.g., an administrative level user).

In some examples, the capital subsystem 170 can generate a list of target grades including the potential rent levels and likelihoods of occupancy associated with each of the target grades. Then, for each of the target grades, the capital subsystem 170 can generate a list of recommended tasks for completion and corresponding costs to complete the tasks. The capital subsystem 170 can then cause this information to be presented to various types of users via a user interface on a computing device, including a recommendation that the user selects a particular option in the list. Personnel such as a marketing administrator could add subjective options to the list as well. The optimization analysis performed by the capital subsystem 170 can account for situations where it may be desirable to upgrade a given unit in a facility over an extended period of time (e.g., over multiple unit turns). For example, the capital subsystem 170 can determine that a first task or group of tasks should be performed after a first unit turn and that a second task or group of tasks should be performed after a second unit turn.

The stakeholder approvals subsystem 180 can be configured to present a variety of different types of user interfaces to stakeholders associated with the facility to present information regarding the optimized unit turn plans 172 and to receive approval to proceed with one or more of the optimized unit turn plans 172. Stakeholder approval may only be required in certain scenarios, such as when the cost to implement a recommended and/or selected one of the optimized unit turn plans 172 exceeds a threshold (e.g., a not-to-exceed (NTE) dollar threshold), and/or when the estimated time until the unit is ready (or estimated time to occupancy more broadly) exceeds a threshold amount of time. Stakeholder approval may additionally or alternatively be required if any parameters associated with the optimized unit turn plans 172 (e.g., the target grade for the unit is above or below a threshold, the projected rent level is above or below a threshold, the projected time to occupancy is above or below a threshold, etc.) do not satisfy the stakeholder configurations and preferences data 182.

The user interfaces presented to one or more stakeholders by the stakeholder approvals subsystem 180, or other components of the system 100, can display the current number of units in a given facility (or collection of facilities) by grade and by rent level. The user interfaces can also show occupancy or time to occupancy for unoccupied units, including unit turn times. The user interfaces can also show any other additional information about units, as well as track the estimated unit turns (e.g., by grade) over time along with the actual unit turns over time. The user interface could also present information regarding tracking of projected and actual spending associated with unit turns, including capital expenses and outside contractor fees. A stakeholder can also input a budget via a user interface, for example, to drive the optimal number of each unit grade and rent level to capture the most return on an investment. The stakeholder can also input a desired number of units at each grade for a given facility via a user interface presented by the system 100. Moreover, various information associated with competitors can be presented via user interfaces by the system 100 to help stakeholders gain a better understanding of the market conditions in a particular location, such as ranges and benchmarking information associated with competitor occupancy rates, rent levels, and unit grades.

If a stakeholder does not approve a given one of the optimized unit turn plans 172, an indication can be sent back to the marketing and sales subsystem 140 such that a marketing administrator or other user may be required to make changes (e.g., selecting a different option, etc.) to the given one of the optimized unit turn plans 172 before it is sent back to the stakeholder approvals subsystem 180 for approval. The system 100 provides the ability for stakeholders to efficiently and effectively optimize maintenance tasks surrounding unit turns in a facility through use of the stakeholder approvals subsystem 180 and integration of the stakeholder configurations and preferences data 182. As a result, stakeholders can use the system 100 to proactively manage one or more facilities and meet various types of objectives (e.g., rent maximization, investment minimization, return on assets over a lifespan, etc.).

After the optimized unit turn plans 172 are approved by one or more stakeholders via the stakeholder approvals subsystem 180, or if the system 100 does not require approval for the optimized unit turn plans 172, the system 100 can generate a finalized, approved plan 174. The approved plan 174 can be fed back to various components of the system 100, including the unit turn optimization subsystem 130, the marketing and sales subsystem 140, and/or the AI-based unit assessment subsystem 150. Moreover, the approved plan 174 can be sent to a contractor system 192 and/or a procurement system 194. The approved plan 174 can indicate a variety of information to the marketing and sales subsystem 140, for example, including the target grade, the target rent level for the vacated unit, the estimated time to occupancy upon completion of the approved plan 174, the estimated time for completion of the maintenance tasks and/or procurement of items in the approved plan 174, and any other information useful to marketing and sales personnel. Upon completion of the approved plan 174, the system 100 can send a notification to the marketing and sales subsystem 140 indicating that the vacated unit is ready for a new resident.

The approved plan 174 can include a variety of information indicative of maintenance tasks to be performed for a given vacated unit. The approved plan 174 can also include information indicative of any items for ordering (purchasing) in accordance with the maintenance tasks. The system 100 can interface with the contractor system 192 to either automatically or semi-automatically coordinate and schedule outside workers to complete one or more maintenance tasks that fall outside the capabilities of the internal maintenance staff at a given facility. For example, the system 100 can provide a maintenance task to an outside contractor that does have capability to perform the maintenance task to an outside contractor responsive to determining that an internal maintenance staff associated with a given facility does not have capability to perform the maintenance task. The system 100 can further interface with the procurement system 194 to either automatically or semi-automatically coordinate purchase orders for any items needed to complete the maintenance tasks in accordance with the approved plan 174.

Upon completion of the approved plan 174, the system 100 can also require that a post unit turn assessment be completed for the vacated unit after the maintenance tasks associated with the approved plan 174 have been completed. For example, upon completion, the system 100 can prompt maintenance personnel associated with a facility (e.g., a maintenance director) to perform a post unit turn assessment and submit a variety of information associated with the renovated unit to the system 100. The post unit turn assessment can be performed to verify that the tasks associated with the approved plan 174 were performed correctly, and the data associated with the post unit turn assessment (e.g., photos, videos, notes, etc.) can be processed by the AI-based unit assessment subsystem 150 to update the current grade for the unit.

Data associated with the post unit turn assessment including the actual work completed, the actual rent received from a new resident, the actual time required to rent the room, and other data can then be assembled into one or more training datasets and used to train one or more models maintained by the AI-based unit assessment subsystem 150 to improve accuracy of the AI-based unit assessment subsystem 150 with respect to generating recommendations and/or grades for different types of units in different types of facilities. Additional data associated with completion of the approved plan 174 such as actual cost of performing work (e.g., the maintenance tasks), actual cost of purchasing items, any feedback from the marketing and sales subsystem 140, and additional human grades can also be assembled into one or more training datasets and used to train one or more models maintained by the AI-based unit assessment subsystem 150 to improve accuracy of the AI-based unit assessment subsystem 150.

In general, there are a variety of use cases for the system 100 in providing technical improvements in terms of facility management capabilities. For one, the system 100 can be used to complete an assessment of a vacated unit and use artificial intelligence to determine a current grade for the vacated unit. Also, the system 100 can be used to generate a list of target grades, or a recommended target grade, with time to occupancy and rent levels given a specific unit within a specific facility within a specific market. Moreover, the system 100 can be used to generate a plan (e.g., including tasks to perform, capital investments, asset purchases, etc.) to get to a target grade that optimizes return while minimizing investment. The plan generation can depend on a variety of factors including the current grade, information about the unit, the target grades determined based on the market and facility level information, and stakeholder preferences and configurations.

It will be appreciated that the system 100 can include more or fewer components beyond what is explicitly shown in FIG. 1, and that certain components of the system 100 as shown in FIG. 1 can be combined (or can overlap) in various ways. For example, the system 100 can include a "Market AI" component that can determine relative market grades for units and/or facilities various input data as described herein. The system 100 can also include a "Position AI" component that can reposition units various input data as described herein (e.g., capital plan history, execution, expenses, unit grades, market grades, etc.). The system 100 can further include a "Occupancy Forecast AI" component that can generate occupancy forecasts for units and/or facilities based on various input data as described herein. The system 100 can also include a "Rent AI" component that can make specific recommendations for target grades for units and/or facilities using various input data as described herein. The system 100 can also include a "Unit AI" component that uses unit images (and potentially other input data as described herein) to create an objective view of unit marketability (e.g., unit grades). The system 100 can also include a "Capital AI" component that recommends optimal changes to implement to make units reach target grades (e.g., based on capital, products, services, etc.). Each of these AI components can use any suitable types of models and algorithms, including one or more supervised models, unsupervised models, semi-supervised models, deep learning models, and/or any other suitable types of models and algorithms. For example, each of these AI components can be implemented using one or more separate models that are specifically trained for different purposes.

Figure 2:
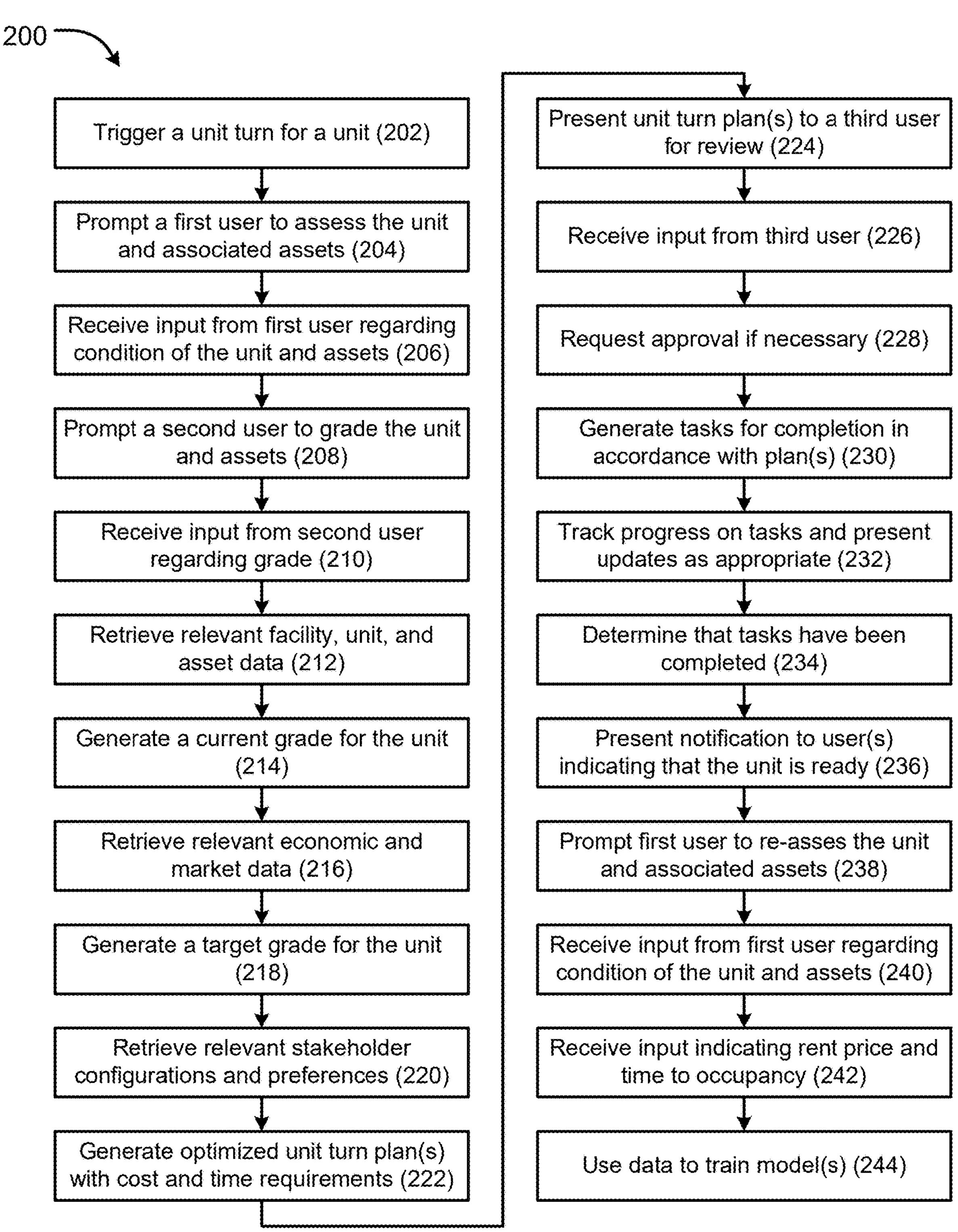
FIG. 2 is a flowchart illustrating an example process for optimizing maintenance of facility units that can be performed using the system of FIG. 1, in accordance with some aspects of the disclosure.

Referring to FIG. 2, a flowchart illustrating an example process 200 for optimizing maintenance of facility units is shown, in accordance with some aspects of the disclosure. The process 200 can be performed by the system 100 as discussed above, for example, to provide technical improvements in facility management capabilities for various entities. The proactive and dynamic facility management functionality provided by the process 200 can help facilities and/or organizations achieve various objectives, including rent maximization, investment minimization, return on assets over a lifespan, and/or other objectives. The process 200 generally uses artificial intelligence to process a variety of different inputs associated with units and facilities, including user inputs received from maintenance personnel and facility stakeholders. The process 200 can generate an approved plan including maintenance tasks for performing on a vacated unit in a facility to achieve one or more objectives. The process 200 can be implemented for various types of facilities, such as senior living and assisted living facilities, among other types of facilities.

The process 200 is shown to include triggering a unit turn for a unit in a facility (202). For example, the unit turn can be triggered responsive to receiving an indication from an electronic medical records system that the unit in the facility has been vacated, among other possible approaches to triggering a unit turn. The unit can be vacated for a variety of reasons and can be any suitable type of unit in a facility, such as various types and styles of residential units. The process 200 is further shown to include prompting a first user to assess the unit and the associated assets in the unit (204). The first user can be a maintenance director (MD) associated with the facility, among other types of personnel. The process 200 can prompt the first user to perform the assessment in any suitable manner, such as by sending various types of electronic messages to the first user (e.g., email, push notification, text message, etc.).

The process 200 is further shown to include receiving an input from the first user regarding the condition of the unit and associated assets (206). The input can include a variety of information detailing the condition of the unit and associated assets, such as photos, videos, notes, and any other information associated with the unit. The assets in the unit can include furniture, appliances (e.g., stove dishwasher, microwave, etc.), HVAC equipment, windows, doors, running water (e.g., sinks, showers, tubs, toilets, etc.), walls, floors, medical equipment (e.g., nurse call devices and systems, heart rate monitors, blood pressure monitors, etc.), and any other assets that may be present in the unit. The first user can submit the input via a variety of different types and/or combinations of user interfaces presented on one or more computing devices, including user interfaces presented via a web browser, a mobile application, a desktop application, and the like.

The process 200 is further shown to include prompting a second user to grade the unit and associated assets (208). The second user can be any suitable type of user with knowledge pertaining to grading units, such as maintenance personnel or marketing and sales personnel. Further, the second user in some examples can be the same user as the first user. The second user can grade the unit and associated assets based on the input provided by the first user detailing the condition of the unit. The process 200 can prompt the second user to perform the assessment in any suitable manner, such as by sending various types of electronic messages to the second user (e.g., email, push notification, text message, etc.). The process 200 is further shown to include receiving an input from the second user regarding the grade for the unit (210). For example, responsive to the prompt and based on the input provided by the first user detailing the condition of the unit, the second user can submit the grade for the unit. The grade can be in any suitable format, such as a letter grade (e.g., A-F) or a numerical grade (e.g., 1-100). The second user can submit the input via a variety of different types and/or combinations of user interface presented on one or more computing devices, including user interfaces presented via a web browser, a mobile application, a desktop application, and the like.

The process 200 is further shown to include retrieving relevant facility, unit, and asset data (212). For example, the process 200 can retrieve any relevant data needed to determine a current grade for the unit, such as the rent data 111, the units and assets data 112, the occupancy data 113, the census data 114, the geography data 115, and/or the floor plan data 116 as detailed above. Then, the process 200 is shown to include generating a current grade for the unit (214). The process 200 can generate the current grade for the unit based on the human grade provided by the second user as well as any of the relevant facility, unit, and asset data retrieved. The process 200 can generate the current grade for the unit using one or more artificial intelligence models, for example by using the AI-based unit assessment subsystem 150 as detailed above.

The process 200 is further shown to include retrieving relevant economic and market data (216). For example, the process 200 can retrieve any of the as the stakeholder configurations and preferences data 182, the external occupancy data 121, the food data 122, the hospitality rooms data 132, the market topography data 132, the facility occupancy estimates 123, and/or any data form the marketing and sales subsystem 140 as detailed above. Then, the process 200 is shown to include generating a target grade for the unit (218), retrieving relevant stakeholder configurations and preferences (220), and generating one or more optimized unit turn plans with associated cost and time requirements (222). In some examples, step 220 can come before step 218, such that the process 200 includes using the stakeholder configurations and preferences data 182 to generate the target grade for the unit (e.g., stakeholders can configure preferences to err on the side of lower or higher target grades). The process 200 can generate the target grade for the unit based on a variety of factors, such as detailed above with respect to the unit return options subsystem 160. The process 200 can also generate the optimized unit turn plans based on a variety of factors, such as detailed above with respect to the capital subsystem 170.

The process 200 is further shown to include presenting the optimized unit turn plan(s) to a third user for review (224) and receiving an input from the third user (226). The third user can be an individual associated with marketing and sales, in some examples, among other suitable types of individuals such as administrative users. The unit turn plans can be presented to the third user via a variety of suitable manners, and the input can be received form the third user in a variety of suitable manners, such as via various types of user interfaces presented on one or more computing devices, including user interfaces presented via a web browser, a mobile application, a desktop application, and the like. The third user can select a given optimized unit turn plan from a list of optimized unit turn plans, in some examples, based on various parameters associated with the optimized unit turn plans.

The process 200 is further shown to include requesting approval if necessary (228). For example, the process 200 can request approval from a facility stakeholder to proceed with a selected optimized unit turn plan responsive to determining that a cost associated with the selected optimized unit turn plan exceeds a threshold, when the estimated time until the unit is ready (or estimated time to occupancy) exceeds a threshold amount of time, when the target grade for the unit is above or below a threshold, when the projected rent level is above or below a threshold, or responsive to determining that any other parameters associated with the selected optimized unit turn plan do not align with the stakeholder configurations and preferences data 182. In some examples, approval is not necessary, and the process 200 can proceed without requesting approval.

The process 200 is further shown to include generating one or more tasks for completion in accordance with the approved optimized unit turn plan(s) (230). The tasks for completion can include a wide variety of different types of tasks, including maintenance tasks (e.g., replacing items, cleaning tasks, remodeling tasks, etc.), procurement tasks (e.g., submitting purchase orders for one or more items such as appliances, furniture, paint, countertops, etc.), and any other tasks for performing to turn the unit over from the previous resident to a new resident. Once the tasks are generated, the process 200 can further cause the tasks to be provided to various personnel (e.g., maintenance personnel, outside contractors, procurement personnel, etc.) via various types of computing devices in various manners. For example, the process 200 can provide the tasks to appropriate personnel by sending out various types of electronic messages (e.g., email, push notification, text message, etc.) and/or providing indications via various types of user interfaces (e.g., user interfaces presented via a web browser, a mobile application, a desktop application, etc.). The personnel that receive the tasks can then use the tasks and associated details provided with the tasks to modify and upgrade the unit such that the unit can be associated with the target grade instead of the current grade, for example.

The process 200 is further shown to include tracking progress on the tasks and presenting updates as appropriate (232). For example, the process 200 can receive indications from the personnel responsible for completing the tasks that the tasks have been completed and can present updates to one or more facility stakeholders as different tasks associated with an approved plan are completed. The indications that the tasks have been completed can be received in any suitable manner from computing devices associated with the personnel responsible for completing the tasks, and the updates can be presented to the facility stakeholders in any suitable manner, such as via a variety of types of electronic user interfaces.

The process 200 is further shown to include determining that the tasks associated with the approved plan have been completed (234). For example, responsive to received indications from the personnel responsible for completing the tasks that all of the tasks for the approved plan have been completed, the process 200 can make the determination. The process 200 is further shown to include presenting one or more notifications to one or more users indicating that the unit is ready for a new resident (236). For example, the process 200 can provide notifications in any suitable manner (e.g., email, push notification, text message, user interfaces, etc.) to a variety of personnel such as sales and marketing personnel, maintenance personnel, administrative users, and/or facility stakeholders.

The process 200 is further shown to include prompting the first user to re-assess the unit and associated assets (238) and receiving another input from the first user regarding the updated condition of the unit and associated assets (240). The process 200 can again prompt the user to perform the re-assessment in any suitable manner, such as by sending various types of electronic messages to the first user (e.g., email, push notification, text message, etc.). The process 200 can also receive the input from the first user regarding the updated condition of the unit and associated assets in a variety of suitable manners, such as by receiving the input as submitted by the first user via a variety of different types and/or combinations of user interfaces presented on one or more computing devices, including user interfaces presented via a web browser, a mobile application, a desktop application, etc. The input can include a variety of information detailing the updated condition of the unit and associated assets, such as photos, videos, notes, and any other information associated with the updated unit.

The process 200 is further shown to include receiving an input indicating the actual rent price collected for the unit once a new resident moves in and the actual time to occupancy by the new resident (242). The process 200 can include receiving this input in any suitable manner, such as receiving data automatically from the marketing and sales subsystem 140. Finally, the process 200 is shown to include using the input indicating the actual rent price collected for the unit once a new resident moves in and the actual time to occupancy by the new resident to train one or more models (244). The input indicating the actual rent price collected for the unit once a new resident moves in and the actual time to occupancy by the new resident to train one or more models maintained by the AI-based unit assessment subsystem 150 to improve accuracy of the AI-based unit assessment subsystem 150. The input indicating the actual rent price collected for the unit once a new resident moves in and the actual time to occupancy by the new resident, as well as potentially other data surrounding the unit turn, can be assembled into one or more training datasets used to train the one or more models.

For example, outcome data including the actual rent price collected for the unit once a new resident moves in and the actual time to occupancy of the unit by the new resident (e.g., as generated based on the input received at 242) can be used to validate and/or train a first model that is maintained by the system 100 and designed to associate rent levels with market unit grades. The first model can receive a current unit grade for a particular unit, economic data associated with the particular unit, and/or stakeholder preference data associated with the particular unit (or facility associated with the particular unit) as input, and generate a recommended rent level (and/or a recommended target grade) as output. As another example, outcome data including an updated (reassessed) unit grade (e.g., as generated based on the input received at 240) can be used to validate and/or train a second model that model that is maintained by the system 100 and designed to recommend optimized unit turn plans. The second model can receive a current unit grade and a target unit grade as input and, and generate a recommended unit turn plan (e.g., one or more maintenance tasks for completion) that can be implemented to move a unit from the current unit grade to the target unit grade as output.

As yet another example, outcome data including actual time to occupancy (e.g., as generated based on the input received at 242) can be used to validate and/or train a third model that model that is maintained by the system 100 and designed to predict time to occupancy for units (e.g., based on target unit grade, current unit grade, time associated with tasks in a unit turn plan, maintenance staff availability, asset acquisition time, market factors, recent unit turn time to occupancy, etc.). The third model can receive various types of inputs associated with a given unit as input, and generate a predicted time to occupancy as output. The system 100 can also maintain a fourth model that is designed to generate current unit grades as output responsive to receiving various possible inputs associated with units, as detailed herein.

While the steps of the process 200 are shown in a particular order in FIG. 2, the process 200 may not include all steps shown, may include additional steps, or may include the steps in a different order. Also, information pertaining to systems, methods, and media that can facilitate efficiencies in terms of managing various aspects of the process 200 are described in U.S. patent application Ser. No. 18/125,578, filed Mar. 23, 2023, the entire disclosure of which is incorporated herein by reference.

Figure 3:
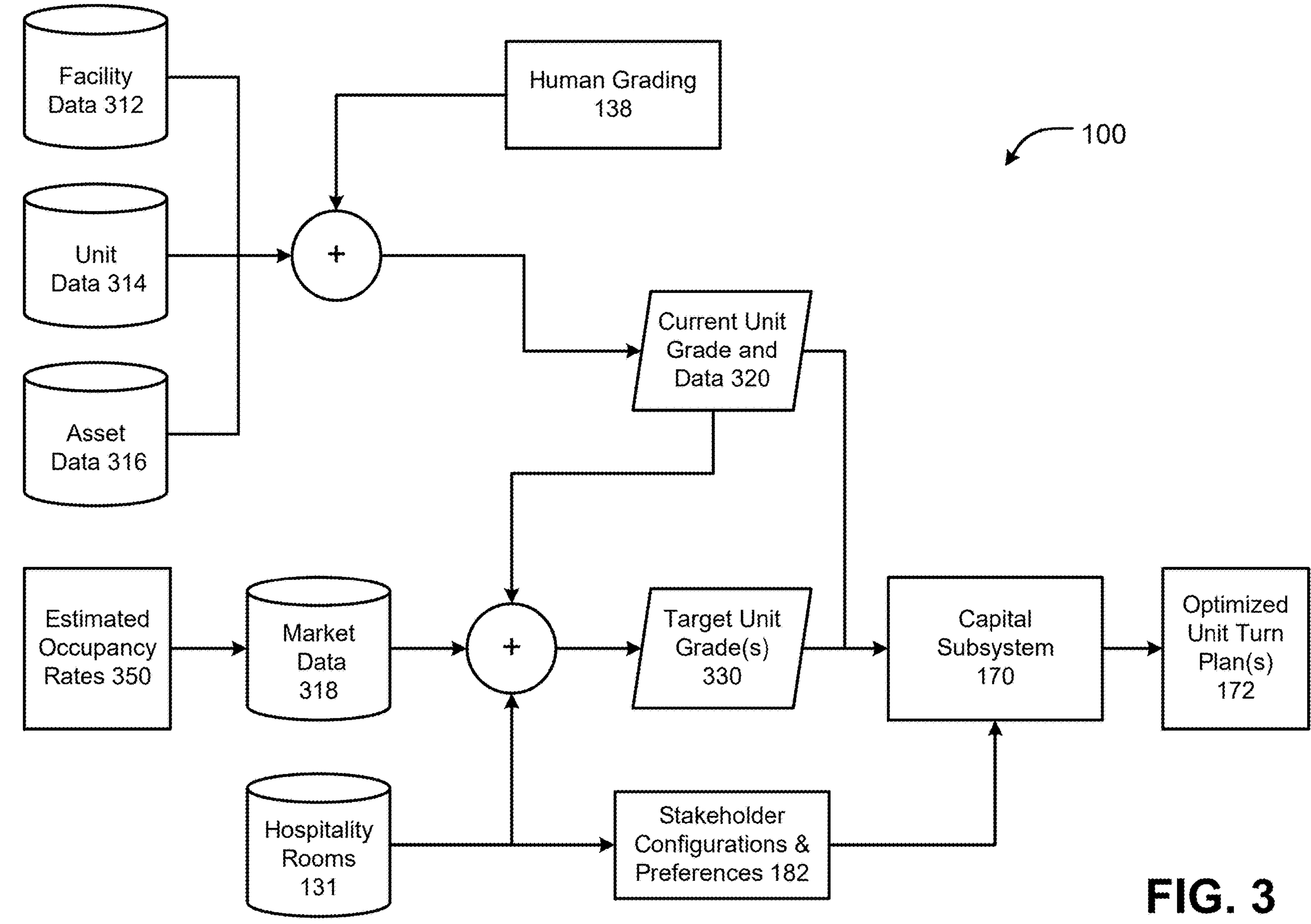
FIG. 3 is a block diagram illustrating data flow within the system of FIG. 1, in accordance with some aspects of the disclosure.

Referring to FIG. 3, a block diagram illustrating data flow within the example system 100 for optimizing maintenance of facility units is shown, in accordance with some aspects of the disclosure. The data flow diagram shown in FIG. 3 includes various data sources, subsystem components, junctions, and outputs. For example, the human grading data 138 can be combined with facility data 312, unit data 314, and asset data 316 to generate a current unit grade 320 and associated data. Additionally, the current unit grade 320 can be combined with market data 318, which includes estimated occupancy rates 350, and the hospitality rooms data 131 to generate one or more target unit grades 330. The current unit grade 320, the target unit grades 330, and the stakeholder configurations and preferences data 182 can then be provided as inputs to the capital subsystem 170. Finally, the capital subsystem 170 can analyze the current unit grade 320, the target unit grades 330, and the stakeholder configurations and preferences data 182 using one or more unit turn optimization algorithms to generate one or more optimized unit turn plans 172.

The facility data 312 can include a variety of data associated with a particular facility that a vacated unit is located in. For example, the facility data 312 can include a facility grade and/or other information related to the quality of the facility. The facility data 312 can further include information about the location of the facility, floor plans associated with the facility, amenities in the facility, and information about units in the facility such as occupancy of units and rent levels of units. The unit data 314 can include a variety of data associated with the vacated unit such as the location of the unit (e.g., floor, etc.), the view from the unit, the size of the unit, amenities within the unit itself, accessibility information associated with the unit, data indicative of the condition of the unit (e.g., images, videos, notes, etc.), historical rent level data for the unit, historical data indicative of one or more grades associated with the unit and more generally the quality of the unit, and asset information indicative of assets within the unit.

The asset data 316 can include a variety of information associated with individual assets in the unit, such as the type of asset, the quality of the asset, data indicative of the condition of the asset (e.g., images, videos, notes, etc.), age of the asset, and cost of the asset. It will be appreciated that the facility data 312, the unit data 314, and the asset data 316 can overlap to varying degrees with the rent data 111, the units and assets data 112, the occupancy data 113, the census data 114, the geography data 115, and the floor plan data 116 as detailed above. The human grading data 138 can include a variety of different information submitted to the system 100 (e.g., via a user interface presented on a computing device) related to grading of the unit and assets within unit as performed by one or more humans, as detailed above. The human grading data 138 can include human-generated grades for the unit, the facility, and/or the assets within the unit.

The estimated occupancy rates 350 can be similar to and/or the same as the facility occupancy estimates 123 discussed above. For example, the estimated occupancy rates 350 can use the external occupancy data 121 and/or the food data 122 to determine real-time occupancy estimates for one or more facilities. The hospitality rooms data 131, as discussed above, can include a variety of information related to hospitality rooms (e.g., publicly available data regarding hospitality rooms at hotels), such as prices, quality and grades, and occupancy rate information. The market data 318 can include a variety of data indicative of market and economic conditions associated with a particular facility. For example, the market data 318 can include the number of facilities in a given market associated with different grades, the number of units in a given market associated with different grades, information regarding unit demand by grade, occupancy rate data (e.g., an average occupancy rate associated with all facilities of a given type in a geographic area, a median occupancy rate associated with all facilities of a given type in a geographic area), rent level data (e.g., average rent level associated with a geographic area, median rent level associated with a geographic area, etc.), economic data, demographic trends, new construction trends, and any other types of market data indicative of any types of economic conditions associated with a particular facility.

The human grading data 138 can be combined with facility data 312, unit data 314, and asset data 316 can be provided as input to the AI-based unit assessment subsystem 150 to generate the current unit grade 320. Since the AI-based unit assessment subsystem 150 includes models that are trained with a variety of real-world data, the AI-based unit assessment subsystem 150 can generate the current unit grade 320 such that the current unit grade 320 eliminates various biases that may be present in the human grading data 138. The current grade 320 generated by the AI-based unit assessment subsystem 150 can then be provided as input to the unit return options subsystem 160 along with the market data 318, the hospitality rooms data 131, and/or the stakeholder configurations and preferences data 182. Then, the unit return options subsystem 160 can generate the one or more target unit grades 330.

The current unit grade 320, the one or more target unit grades 330, and the stakeholder configurations and preferences data 182 can then be provided as input to the capital subsystem 170 to perform unit turn optimization analysis. The capital subsystem 170 can then generate the one or more optimized unit turn plan 172, which can optionally be sent to the marketing and sales subsystem 140 for review, modification, and/or selection. The unit turn plans 172 can include targets for cost and time to completion, projected rent levels, projected time to occupancy, lists of unit turn maintenance tasks, and/or lists of associated capital acquisitions. Then, one or more of the optimized unit turn plans 172 can be provided as input to the stakeholder approvals subsystem 180 before the system 100 ultimately generates the approved plan 174. The data flow diagram shown in FIG. 3 is provided as an example to help the skilled person understand aspects of the disclosure, and it will be appreciated that modifications to the data flow paths within the system 100 are possible and contemplated.

In some examples, the current unit grade 320 can be considered an "absolute unit grade" that the system 100 can determine based on the assets and condition of a given unit. Then, the system 100 can also determine a "market unit grade" based on the absolute unit grade and other data such as the market data 318, the hospitality rooms data 131, and/or the facility data 312, for example. Then, the system 100 can generate recommended target unit grades 330 based on the absolute unit grade and/or the market unit grade, such that the recommended target unit grades 330 are based not only on the absolute unit grade, but also based on other factors such as other unit grades in the facility, owner/operator configurations, desired number of each unit grade, occupancy turnaround, budget, capital, and expected returns, for example.

As noted above, it will also be appreciated that the system 100 can be implemented in a wide variety of manners, including various software architectures, hardware architectures, and network architectures. For example, some of the components of the system 100 as shown in FIG. 1 can be implemented on one or more on-premises servers at a facility, some of some of the components of the system 100 as shown in FIG. 1 can be implemented on one or more remote (cloud-based) servers), and some of the components of the system 100 as shown in FIG. 1 can be implemented via one or more computing devices (e.g., personal computers, mobile devices, etc.) associated with different individuals, facilities, and/or organizations. Moreover, some of the components of the system 100 as shown in FIG. 1 can be received as input via a user interface presented on a computing device, and some of the components of the system 100 as shown in FIG. 1 can be implemented can be presented as outputs via a user interface presented on a computing device. The data sources shown in FIG. 1 can be implemented within memory of these servers and/or computing devices, and/or can be remote databases.

Figure 4:
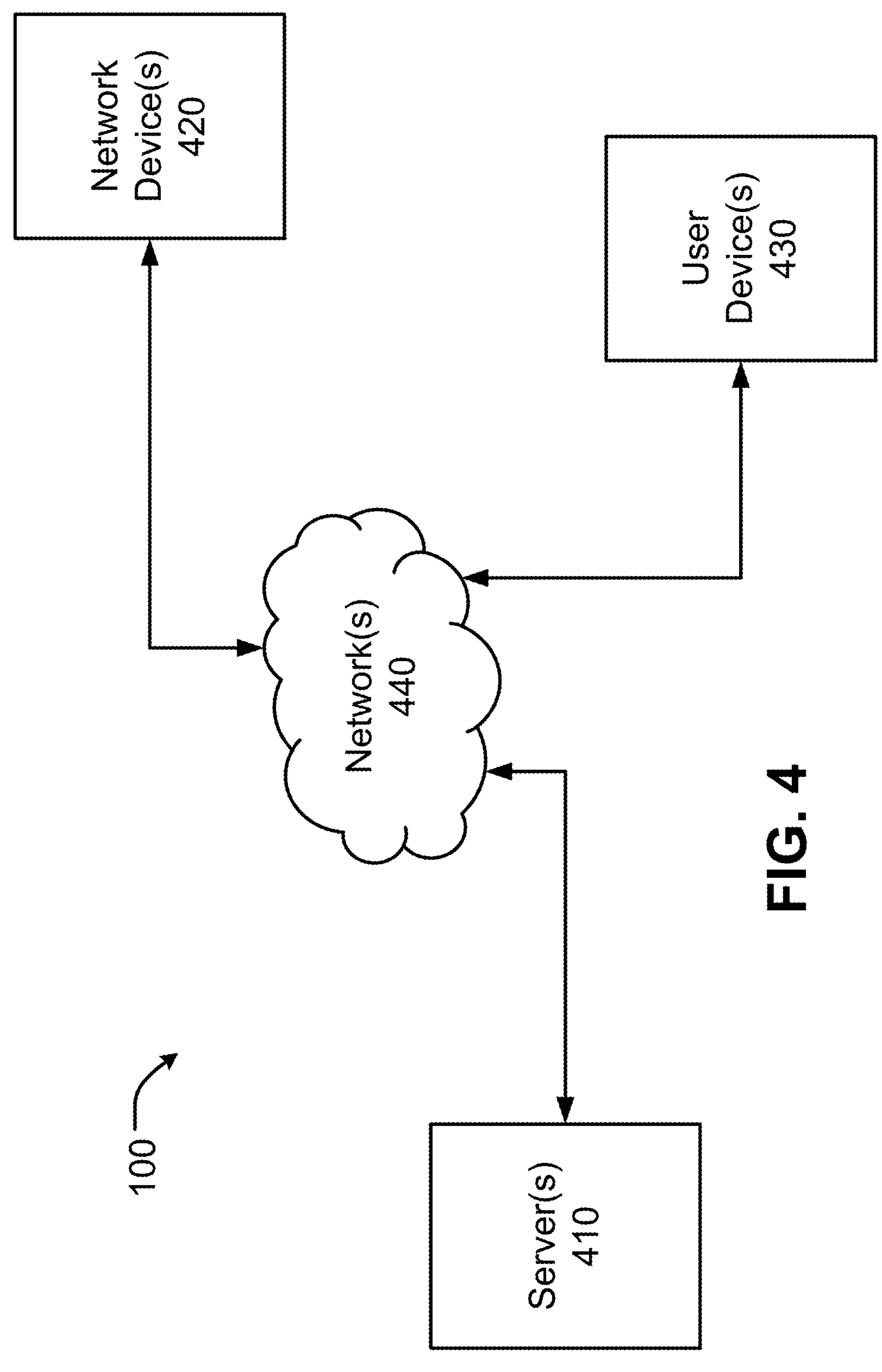
FIG. 4 is a block diagram illustrating example hardware and networking components that can be used to implement the system of FIG. 1, in accordance with some aspects of the disclosure.

Referring to FIG. 4, a block diagram illustrating example hardware and networking components that can be used to implement the example system 100 for optimizing maintenance of facility units is shown, in accordance with some aspects of the disclosure. As shown, the system 100 can include one or more servers 410, one or more network devices 420, one or more user devices 430, and one or more networks 440. The components of the system 100 as illustrated in FIG. 1 and FIG. 3, for example, can be implemented using the servers 410, the network devices 420, and/or the user devices 430, and can communicate with each other via the networks 440.

The servers 410 can include one or more on-premises servers installed within a facility and/or one or more remote, cloud-based servers installed in a location remote to the facility, such as one or more data centers. That is, the servers 410 can be implemented as a hybrid combination of one or more on-premises servers and one or more remote servers, in some examples. The servers 410 can be implemented using a variety of different types of hardware and software configurations, including using different types of processing devices including central processing units (CPUs), graphics processing units (GPUs,) and various types of memory (e.g., random-access memory (RAM), read-only memory (ROM), electrically erasable programmable read-only memory (EEPROM), one or more flash drives, one or more hard disks, one or more solid state drives, one or more optical drives, etc.). The servers 410 can include one or more non-transitory computer-readable storage media having instructions stored thereon that, when executed by one or more processors of the server 410, cause servers 410 to implement operations according to the instructions.

The networking devices 420 can include any suitable types of networking devices such as gateway devices, switches, routers, and/or other similar types of networking devices used to route electronic communications withing the system 100. The networking devices 420 can include one or more non-transitory computer-readable storage media having instructions stored thereon that, when executed by one or more processors of the networking devices 420, cause the networking devices 420 to implement operations according to the instructions. The user devices 430 can include any of a variety of suitable types of user devices including various types of personal computing devices (e.g., smartphones, laptops, tablets, desktop computers, personal computers, gaming devices, wearable devices, etc.). The user devices 430 can be implemented using a variety of different types of hardware and software configurations, including using different types of processing devices including CPUs, GPUs, and various types of memory (e.g., RAM, ROM, EEPROM, one or more flash drives, one or more hard disks, one or more solid state drives, one or more optical drives, etc.). The user devices 430 can include one or more non-transitory computer-readable storage media having instructions stored thereon that, when executed by one or more processors of the user devices 430, cause the user devices 430 to implement operations according to the instructions.

The networks 440 can include any suitable types and combinations of electronic communication networks, such as Wi-Fi networks, peer-to-peer networks (e.g., a Bluetooth network), cellular networks (e.g., 3G networks, 4G networks, 5G networks, etc., complying with any suitable standard(s), such as CDMA, GSM, LTE, LTE Advanced, WiMAX, 5G NR, etc.), wired networks (e.g., Ethernet), etc. The networks 440 can further include local area networks (LAN), wide area networks (WAN), public networks (e.g., the Internet, which may be part of a WAN and/or LAN), private or semi-private networks (e.g., a corporate intranet), or any other suitable types of networks and communication protocols. Additional examples and details about possible implementations of the system 100 as detailed herein are provided in U.S. patent application Ser. No. 17/849,380, the entire disclosure of which is incorporated by reference herein.

This description uses examples to disclose the invention and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A computer-implemented method for predicting an occupancy schedule for a unit in a facility, comprising:

subsequent to the unit in the facility being vacated by a resident, receiving an input from a first user via a first computing device, the input detailing a condition of the unit in the facility;

generating a current grade for the unit in the facility based on the input detailing the condition of the unit in the facility;

identifying a target grade and a target time-to-occupancy for the unit in the facility;

determining, using one or more predictive machine learning (ML) models, a maintenance task for completion to modify the unit in the facility such that the unit in the facility can be associated with the target grade instead of the current grade, based on the one or more predictive ML models generating an output in response to receiving an input that includes the maintenance task, the output including a predicted time-to-occupancy resulting from the completion of the maintenance task or one or more predicted likelihoods that the completion of the maintenance task will result in one or more target time-to-occupancies, wherein the one or more predictive ML models are trained using a dataset that includes outcome data including actual time-to-occupancies associated with historical maintenance tasks; and in response to the output of the one or more predictive ML models satisfying the target time-to-occupancy, providing the maintenance task to a second user via a second computing device such that the second user can complete the maintenance task to modify the unit in the facility such that the unit in the facility can be associated with the target grade instead of the current grade and can satisfy the target time-to-occupancy.

2. The method of claim 1, wherein receiving the input from the first user detailing the condition of the unit in the facility comprises receiving images of the unit in the facility.

3. The method of claim 1, wherein generating the current grade for the unit in the facility based on the input detailing the condition of the unit in the facility comprises generating the current grade for the unit in the facility using the one or more predictive ML models.

4. The method of claim 1, comprising:

generating a first unit turn plan comprising a first target grade for the unit in the facility and a first maintenance task for completion to modify the unit in the facility such that the unit in the facility can be associated with the first target grade instead of the current grade;

generating a second unit turn plan comprising a second target grade for the unit in the facility and a second maintenance task for completion to modify the unit in the facility such that the unit in the facility can be associated with the second target grade instead of the current grade;

providing the first unit turn plan and the second unit turn plan to a third user via a third user device; and receiving a selection of the first unit turn plan from the third user via the third user device;

wherein identifying the target grade for the unit in the facility comprises identifying the target grade as the first target grade responsive to receiving the selection of the first unit turn plan from the third user via the third user device; and wherein determining the maintenance task for completion comprises determining the maintenance task to be the first maintenance task responsive to receiving the selection of the first unit turn plan from the third user via the third user device.

5. The method of claim 1, comprising:

applying the current grade for the unit in the facility and the economic data associated with the location of the facility as input to the one or more predictive ML models; and determining a recommended rent level based on an output of the one or more predictive ML models;

wherein the target rent for the unit desired by the stakeholder is the recommended rent level.

6. The method of claim 1, wherein providing the maintenance task to the second user via the second computing device comprises providing the maintenance task to an internal staff member associated with the facility.

7. The method of claim 1, wherein the first user is the same as the second user.

8. The method of claim 1, wherein the predicted time-to-occupancy includes a predicted time until the unit is ready for a new resident.

9. The method of claim 1, comprising:

providing an indication of the target grade for the unit in the facility and the maintenance task for completion to modify the unit in the facility to a stakeholder associated with the facility for approval via a third computing device; and receiving a second input from the stakeholder associated with the facility from the third computing device, the second input comprising an approval of the target grade for the unit in the facility and the maintenance task for completion to modify the unit in the facility;

wherein providing the maintenance task to the second user via the second computing device comprises providing the maintenance task to the second user via the second computing device responsive to receiving the approval.

10. The method of claim 9, comprising:

determining that the predicted time-to-occupancy included in the output generated by the one or more predictive ML models associated with the maintenance task exceeds a threshold amount of time;

wherein providing the indication of the target grade and the maintenance task to the stakeholder for approval via the third computing device comprises providing the indication of the target grade and the maintenance task to the stakeholder for approval responsive to determining that the predicted time-to-occupancy included in the output generated by the one or more predictive ML models associated with the maintenance task exceeds the threshold amount of time.

11. The method of claim 1, wherein determining the maintenance task for completion to modify the unit in the facility comprises:

applying the current grade for the unit in the facility and the target grade for the unit in the facility as input to the one or more predictive ML models;

determining a unit turn plan for the unit in the facility based on an output of the one or more predictive ML models; and identifying the maintenance task as being part of the unit turn plan.

12. The method of claim 11, comprising:

receiving an updated grade for the unit in the facility after completion of the maintenance task; and training the one or more predictive ML models based on the updated grade.

13. The method of claim 1, wherein:

receiving the target time-to-occupancy for the unit desired by a stakeholder; and identifying the target grade for the unit in the facility comprises applying the preference data and the economic data as input to the one or more predictive ML models.

14. The method of claim 13, comprising:

receiving indication of an actual time-to-occupancy associated with a resident that moves into the unit in the facility; and training the one or more predictive ML models based on the actual time-to-occupancy.

15. The method of claim 1, comprising:

prompting a third user to provide a human grade for the unit in the facility based on the input detailing a condition of the unit in the facility; and receiving a second input from the third user via a third computing device, the second input comprising the human grade for the unit in the facility;

wherein generating the current grade for the unit in the facility comprises generating the current grade for the unit in the facility based on the human grade for the unit in the facility.

16. The method of claim 15, wherein generating the current grade for the unit in the facility comprises generating the current grade for the unit in the facility by applying the input detailing the condition of the unit in the facility and the human grade for the unit in the facility as input to the one or more predictive ML models.

17. The method of claim 16, comprising:

receiving an indication of an actual rent received from a new resident that moves into the unit in the facility;

receiving an indication of an actual time-to-occupancy associated with the new resident that moves into the unit in the facility; and training the one or more predictive ML models based on the actual time-to-occupancy.

18. One or more non-transitory computer-readable storage medium having instructions stored thereon that, when executed by processing circuitry, cause the processing circuitry to:

subsequent to a unit in a facility being vacated by a resident, receive an input from a first user via a first computing device, the input detailing a condition of the unit in the facility;

generate a current grade for the unit in the facility based on the input detailing the condition of the unit in the facility;

identify a target grade and a target time-to-occupancy for the unit in the facility;

determine, using one or more predictive ML models, a maintenance task for completion to modify the unit in the facility such that the unit in the facility can be associated with the target grade instead of the current grade, based on the one or more predictive ML models generating an output in response to receiving an input that includes the maintenance task, the output including a predicted time-to-occupancy resulting from the completion of the maintenance task or one or more predicted likelihoods that the completion of the maintenance task will result in one or more target time-to-occupancies, wherein the one or more predictive ML models are trained using a dataset that includes outcome data including actual time-to-occupancies associated with historical maintenance tasks; and in response to the output of the one or more predictive ML models satisfying the target time-to-occupancy, provide the maintenance task to a second user via a second computing device such that the second user can complete the maintenance task to modify the unit in the facility such that the unit in the facility can be associated with the target grade instead of the current grade and can satisfy the target time-to-occupancy.

19. A system for predicting an occupancy schedule for a unit in a facility, comprising:

memory comprising machine-readable instructions; and processing circuitry to execute the machine-readable instructions to:

subsequent to the unit in the facility being vacated by a resident, receive an input from a first user via a first computing device, the input detailing a condition of the unit in the facility;

generate a current grade for the unit in the facility based on the input detailing the condition of the unit in the facility;

identify a target grade and a target time-to-occupancy for the unit in the facility;

determine, using one or more predictive machine learning (ML) models, a maintenance task for completion to modify the unit in the facility such that the unit in the facility can be associated with the target grade instead of the current grade, based on the one or more predictive ML models generating an output in response to receiving an input that includes the maintenance task, the output including a predicted time-to-occupancy resulting from the completion of the maintenance task or one or more predicted likelihoods that the completion of the maintenance task will result in one or more target time-to-occupancies, wherein the one or more predictive ML models are trained using a dataset that includes outcome data including actual time-to-occupancies associated with historical maintenance tasks; and in response to the output of the one or more predictive ML models satisfying the target time-to-occupancy, provide the maintenance task to a second user via a second computing device such that the second user can complete the maintenance task to modify the unit in the facility such that the unit in the facility can be associated with the target grade instead of the current grade and can satisfy the target time-to-occupancy.

20. The system of claim 19, wherein the predicted time-to-occupancy includes a predicted time until the unit is ready for a new resident.

* * * * *